(12) United States Patent
Dupret et al.

(10) Patent No.: US 9,740,986 B2
(45) Date of Patent: Aug. 22, 2017

(54) SYSTEM AND METHOD FOR DEDUCING USER INTERACTION PATTERNS BASED ON LIMITED ACTIVITIES

(75) Inventors: Georges Dupret, Santiago (CL); Benjamin Piwowarski, Glasgow (GB)

(73) Assignee: Excalibur IP, LLC, New York, NY (US)

( * ) Notice: Subject to any disclaimer, the term of this patent is extended or adjusted under 35 U.S.C. 154(b) by 1096 days.

(21) Appl. No.: 12/241,284

(22) Filed: Sep. 30, 2008

(65) Prior Publication Data

US 2010/0082605 A1   Apr. 1, 2010

(51) Int. Cl.
*G06F 7/00* (2006.01)
*G06F 17/30* (2006.01)
*G06N 99/00* (2010.01)

(52) U.S. Cl.
CPC ..... *G06N 99/005* (2013.01); *G06F 17/30864* (2013.01)

(58) Field of Classification Search
None
See application file for complete search history.

(56) References Cited

U.S. PATENT DOCUMENTS

| | | | |
|---|---|---|---|
| 6,701,309 B1* | 3/2004 | Beeferman et al. | ... 707/999.003 |
| 7,761,464 B2* | 7/2010 | Radlinski | .......... G06F 17/30867 |
| | | | 707/706 |
| 2005/0102259 A1* | 5/2005 | Kapur | ............... 707/1 |
| 2006/0212265 A1* | 9/2006 | Amitay et al. | ................ 702/182 |
| 2006/0230040 A1* | 10/2006 | Curtis | ................ G06F 17/3087 |
| 2007/0266002 A1* | 11/2007 | Chowdhury et al. | ............. 707/2 |
| 2008/0215581 A1* | 9/2008 | Messing et al. | ................... 707/6 |
| 2012/0159317 A1* | 6/2012 | Di Cocco et al. | ............ 715/261 |

* cited by examiner

*Primary Examiner* — Jau-Shya Meng
*Assistant Examiner* — Thomas Meng
(74) *Attorney, Agent, or Firm* — Berkeley Law & Technology Group, LLP

(57) ABSTRACT

The present invention is directed to a method and system for determining user interaction patterns. The method and system comprises generating a plurality of atomic sessions by grouping search events related to a user and a query string using a search engine. The method and system includes using the atomic sessions, constructing a first query chain based on actions of the user to satisfy an information need. The method and system includes dividing the first query chain into at least one smaller chain by both a time factor and a query similarity factor. And the method and system includes determining user-interaction patterns relating to the search engine using the at least one smaller chain.

17 Claims, 4 Drawing Sheets

SYSTEM AND METHOD FOR DEDUCING USER INTERACTION PATTERNS BASED ON LIMITED ACTIVITIES

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

The present invention relates generally to determining user interaction patterns based on user activities, and more specifically to deducing user interaction based on limited user activities.

BACKGROUND OF THE INVENTION

Mining user web search activity potentially has a broad range of applications including web result pre-fetching, automatic search query reformulation, click spam detection, estimation of document relevance and prediction of user satisfaction. This analysis is difficult because the data recorded by search engines while users interact with them, although abundant, is very noisy.

There are large sources of implicit information about user web search interests in the Internet logs that record user actions. In particular, search engines keep records of their interaction with users in click-through logs, which record a temporary user id (through login or cookies), the queries issued by the user, the results returned by the engine and the resulting user clicks.

There are many benefits to tracking and analyzing this search engine behavior, including behavior relating to sequences of queries related to a single query intent or information need. For example, one benefit is for analyzing the effectiveness of a search result, i.e. if the user received the search results they requested. Existing techniques exist on analyzing large pools of information related to common search requests. For example, current techniques utilize analysis operations on the large amount of information available on common search terms, where many users enter these same search terms and the collected tracking information relates to many varied instances of users interacting with search results to the common search term. By way of example, a common search term may be the name of a famous person, event or location, such as for example "The Golden Gate Bridge" is a well-recognized landmark and may have a large number of common user searches.

Although, in actuality, there exists a long tail of search sessions and user interactivity that cannot be analyzed by current analysis techniques. These long tail search sessions represent specific or individualistic search requests that are not in great volume from the general searching public. Therefore, these search sessions do not generate the same pool size of data and existing data analysis operations are inapplicable.

SUMMARY OF THE INVENTION

The present invention is directed to a method and system for determining user interaction patterns. The method and system comprises generating a plurality of atomic sessions by grouping search events related to a user and a query string using a search engine. The method and system includes using the atomic sessions, constructing a first query chain based on actions of the user to satisfy an information need. The method and system includes dividing the first query chain into at least one smaller chain by both a time factor and a query similarity factor. And the method and system includes determining user-interaction patterns relating to the search engine using the at least one smaller chain.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
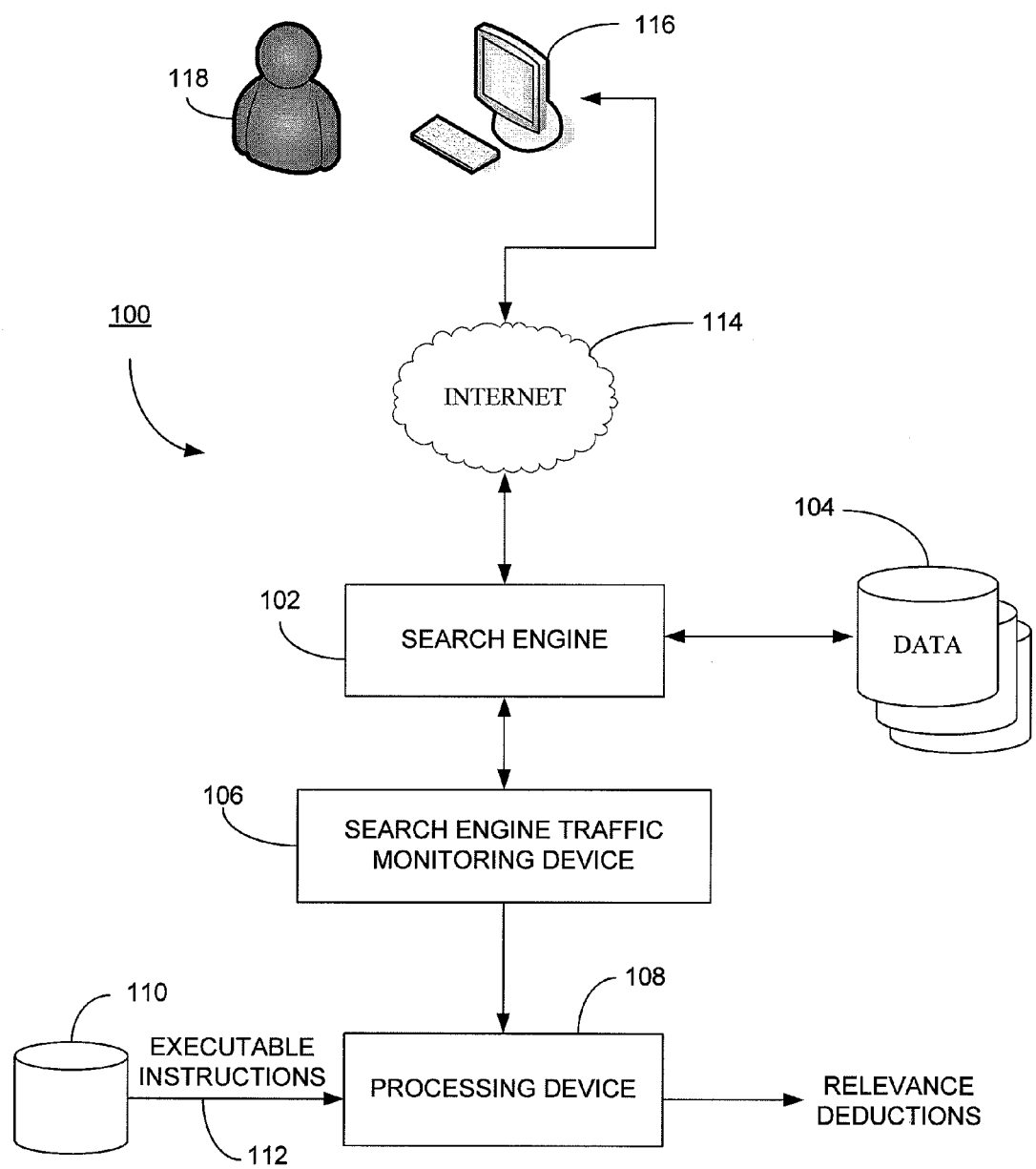
FIG. 1 illustrates one embodiment a processing system that a processing device for determining user interaction patterns.

FIG. 1 illustrates a system 100 that includes a search engine 102, databases 104, a search engine traffic monitoring device 106, a processing device 108, a computer readable medium 110 having executable instructions 112 stored therein. The system 100 also includes the search engine 102, via the internet 114, connected to a user computer 116, accessible by a user 118.

In the system 100, the search engine 102 may be any suitable type of search engine utilizing known search engine technology as recognized by one skilled in the art, including the receipt of a user request, processing the request and generating search result operations. The database 104 may be any number of data storage devices having search information stored thereon, such as for example information about web-based content (e.g. URLs and a description) and advertisement information to be placed in a search results page.

The search engine traffic monitoring device 106 and the processing device 108 may be any suitable type of processing devices operative to perform processing operations as described in further detail below. The computer readable medium 110 may be any suitable type of physical device capable of having the executable instructions 112 stored thereon, for example the computer readable medium 110 may be internal memory within a computing system, or another example the computer readable medium 110 may be an optical disc having the instructions stored thereon. It is recognized that the examples of internal memory and an optical disc are exemplary in nature and are not limiting as to the computer readable medium 110.

The Internet 114 may be any suitable type of networking interconnection allowing for networked communication. The user computer 116 may be any suitable type of remote processing device and is not limited to the illustrated computer, but may also include any mobile device, and more generally relates to any processing device operative to communicate with the search engine 102 via a networked connection, e.g. the network 114.

Figure 2:
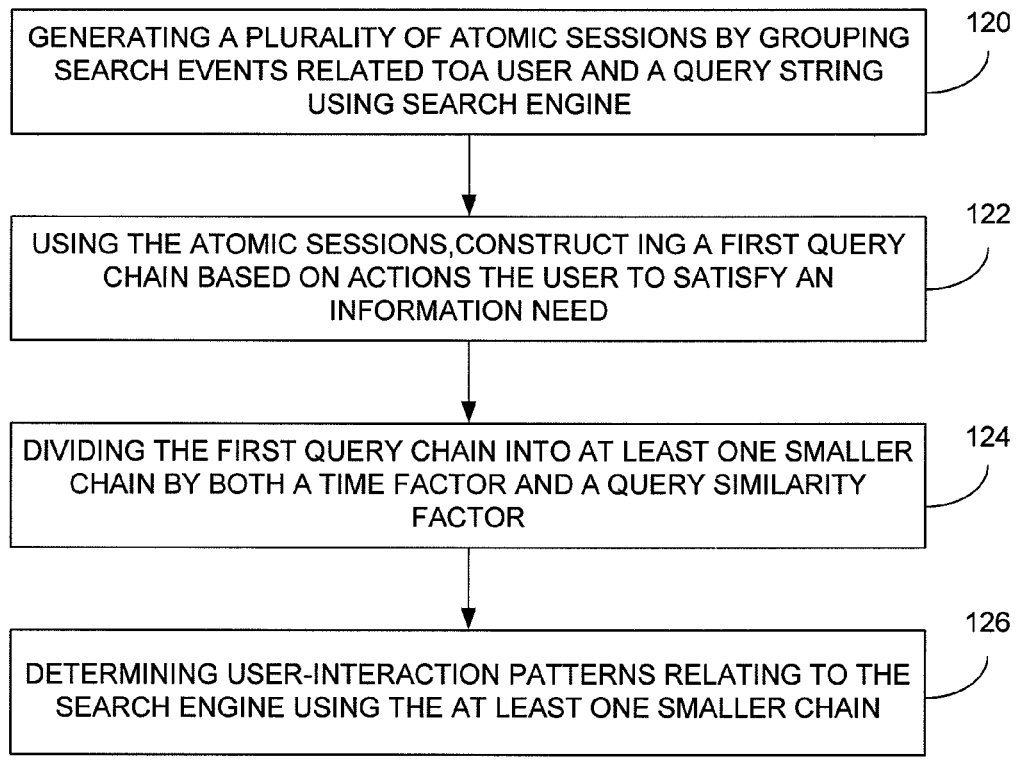
FIG. 2 illustrates a flowchart of the steps of one embodiment of a method for determining user interaction patterns.

For the sake of brevity, the operations of the system 100 of FIG. 1 are described with reference to the flowchart of FIG. 2. FIG. 2 illustrates one embodiment of a method for determining user interaction patterns, where the method may be performed within the system 100 of FIG. 1.

In the system 100, the search engine 102 performs numerous searching operations, such as for the user 118. While operating in accordance with known search engine techniques, the search engine traffic monitoring device 106 monitors the search engine activity, recording the activity. The activity may include not only the user search operations themselves, but also user actions after a search is completed, such as tracking which search results the users select, or for example if the user enters a new search to supplement the original search. Therefore, through the device 106, the system 100 includes a large collection of session information for any number of users using the search engine.

In the method of FIG. 2, a first step, step 120, is generating a plurality of atomic session by grouping search events related to a user and query string using a search engine. The atomic session including grouping all actions related to the same user and related to the same query string or within a defined period of time to indicate a single search session. For example, a defined period of time may be thirty minutes, indicating that a user has conducted and completed the searching operations. The atomic sessions represent individualistic segments of information. In previous systems, these atomic sessions failed to provide any negligible information based on the low level of information granularity, whereby the present invention overcomes the shortcomings of the atomic session information. Relative to FIG. 1, the processing device 108 may be operative to perform the generation step 120 using the executable instructions 112, where the processing device 108 uses the traffic information from the monitoring device 106.

Relative back to FIG. 2, a next step, step 122, is constructing, using the atomic sessions, a first query chain based on actions of the user to satisfy an information need. The next step, step 124 is dividing the first query chain into at least one smaller chain by both a time factor and a query similarity factor. These steps may be performed by the processing device 108 of FIG. 1 in response to the executable instructions 112.

Upon performance of the processing operations, the processing device 108 of FIG. 1 is operative to generate relevance deductions. These deductions may be utilized for any number of purposes in improving search engine technology, consistent with existing technique to utilize feedback in updating or modifying search engine operations. The relevance deductions include assessing the relevance of user click activity user the user-interaction patters as described herein, including assessing the relevance of a document a user has clicked on. For example, it may be determined if a user preformed a search, made a single click on a document, wherein a document may be a active hyperlink, and the session ends, the search may have been successful.

The construction of the first query chain may be performed using a Bayesian network, as described in further detail below. The dividing of the first query chain into one or more smaller chains may include determination of a time factor and a query similarity factor that adjusts the granularity of the division. The time factor, as noted above, may be any suitable time period used to represent a defined user session. The similarity factor provides reasonable assertion for the commonality between different user search operations, such as an exact matching of searching requests (i.e. search terms) to a variance factor, such as denoting singular versus plural terms (e.g. "bridge" versus "bridges.")

In the method of FIG. 2, a next step, step 126, is determining user-interaction patterns relating to the search engine using the at least one smaller chain. Similar to the steps above, the step may be performed by the processing device 108 in response to the executable instructions 112. As described in further detail below, the determination of user-interaction patterns is performed by computational analysis of the smaller chains and the information stored therein. Through the analysis and subsequent determination for user interaction patterns, search engine technology can be vastly improved through the utilization of the feedback relating to these search sessions that fall within the long tail of search session groups and under previous analytical systems, would be ignored as deemed too granular to provide any beneficial feedback.

Query chains are sequences of queries related to a single query intent or information need (for example, finding information about camping sites in Paris), and are different from more high level goals (like planning holidays in Paris). The technique starts by grouping simple user actions (inspecting a new search result list, clicking on a link, etc.) which are equal string queries issued by a single user within a determined time span. For each user, the technique then groups these so-called atomic sessions into query chains using two thresholds, a time threshold and a query similarity threshold.

To analyze this generated data, the technique uses a tree-based layered Bayesian Network (BN) framework where latent variables are designed to explain a subset of user actions. Each layer corresponds to a given granularity of the search process (query chain level, atomic session level, search results inspection process, and document analysis process). The method tries to predict observations (time after a click before the next action, number of queries, number of web search result pages viewed, etc.) that are extracted from the logs. This model in a sense clusters user chains since it can be used to assign a single label (the most probable one) to a series of actions.

Query chains are constructed from the information associated with each user interactions with the search engine, such as examining a page of search results or clicking on a document URL. The construction is fully automatic in the sense that the parameters of the model are estimated from the data and not set by the experimenter.

Figure 3:
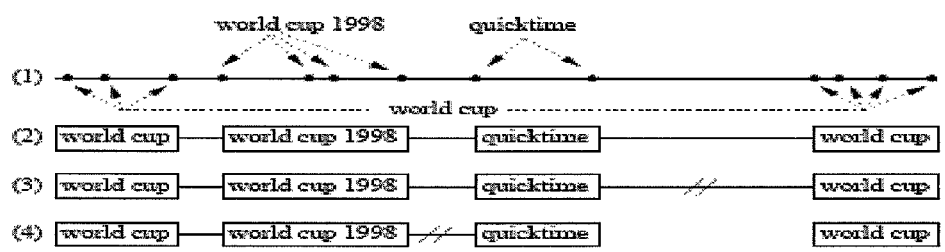
FIG. 3 illustrates a graphical representation of four steps used to build query chains.

The method makes use of a sample of click-through logs from a commercial search engine over a period of time, e.g. days. The search logs are lists of simple events, each being a tuple made of the temporary user id, the time, the query and the action (either viewing a page of results, or clicking on a document). In the exemplary illustration, FIG. 3 illustrates where each point on line (1) represents one such event for the same temporary anonymous user id, and where the x-axis represents the time.

The method and system first constructs atomic sessions, which are all the events associated with the same user id and the same query string (i.e. exactly the same sequence of characters) within a reasonable time frame: After a given amount of time, assume the user has started a new atomic session, even though the query remains the same. Line (2) of FIG. 3 shows the events grouped by matching query strings. The construction of an atomic user session depends only on one parameter, the time frame span. This embodiment uses an exemplary timeout of thirty minutes.

The method then builds chains out of these atomic sessions. The whole process is illustrated in FIG. 3. The most sophisticated approaches to building query chains is based on training over a labeled set of query pairs. Two chains can thus follow each other within a small time delta without being related.

From a high-level description for constructing query chains, the technique starts by concatenating all the atomic sessions for each user, generating a single initial query chain per user. Then, the method and system computes the time delta, i.e. the time difference between two consecutive actions (click, page-view) of an atomic session and analyzes their distribution over all users. One embodiment may include using a global time threshold, giving a set of smaller chains for each user. Then, the method computes a similarity measure, as described in further detail below, between any two adjacent atomic session query strings inside a chain.

To set the time threshold, one embodiment includes computing the inter-session time distribution on the extracted atomic sessions, which is the time between the last action of a session and the first action of the next session. It is estimated that the time between two atomic sessions will be significantly shorter if these are related to the same information need. This suggests that the observed inter-session time is the result of combining two distributions.

Figure 4:
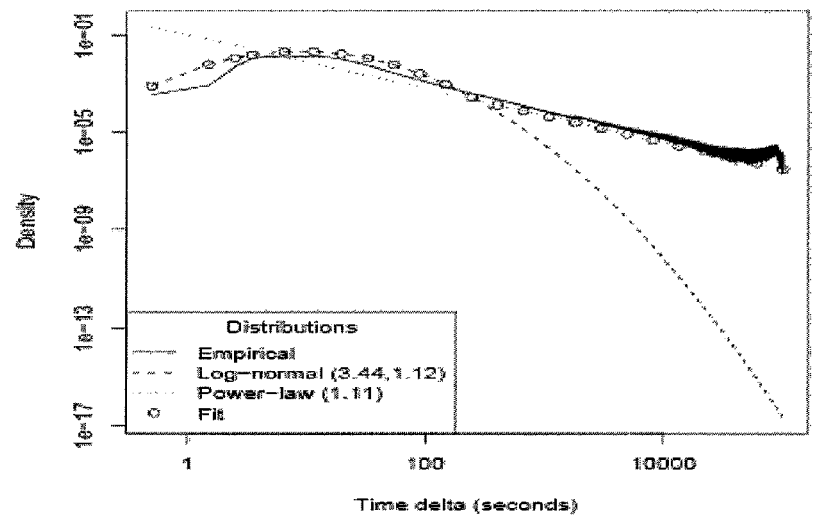
FIG. 4 illustrates a graph of an empirical distribution compared to a log-log scale.

FIG. 4 illustrates empirical distribution compared to the learned model (log-log scale). The empirical time difference distribution is shown in FIG. 4 and seems indeed to be composed of a log-normal[3] distribution followed by a power-law. It seems natural to associate the two distributions to the time between related sessions and unrelated sessions respectively. Line (3) of FIG. 3 shows how the last atomic session "world cup" gets disconnected from the chain based on its time delta with the previous session.

Using this time threshold, the method achieves a first set of candidate chains. Inside some of these chains, the queries seem to correspond to different intents. In order to identify and segment such chains automatically, the method estimates the similarity between the different query strings of adjacent atomic sessions inside a given chain. From that, the technique computes three kinds of similarity measures, one symmetric and two asymmetric:

In the symmetric measure, the query and its potential reformulation are transformed into two vectors of character n-grams frequencies of their query strings. The cosine between these two vectors is then used as a proximity measure.

In the two asymmetric measures, the degree of inclusion of the potential reformulation into the original query and its counterpart, the degree of inclusion of the original query into the reformulation, the degree of inclusion is computed as the probability that a character n-gram appearing in one query appears in the other.

Figure 5:
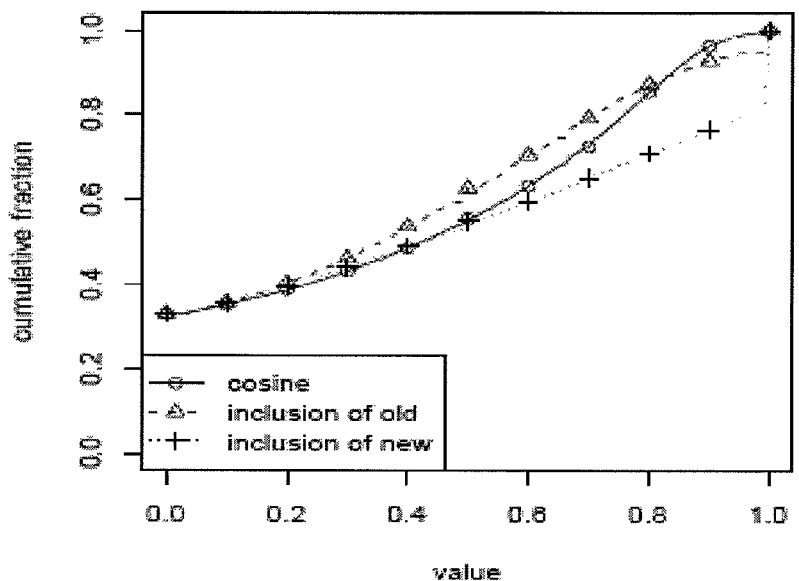
FIG. 5 illustrates graph of cosine similarities relating to the analysis of user interaction patterns.

FIG. 5 plots the value of the cumulative proportion of adjacent pairs of queries joined in the same chain. It can be observed that there is no precise cut point for separating the query chains. Hence, one embodiment includes choosing the thresholds such that 50% of atomic session pairs are included for any of the similarity thresholds. Another embodiment includes using following thresholds: 0.43 for the cosine, 0.36 for the n-gram inclusion of the new into the old query, and 0.43 for the n-gram inclusion of the old query into the new. The method then cuts the chain if all the similarity values were below the indicated thresholds. Line (4) of FIG. 3 shows the last cuts in the chain based on these similarity measures. These values just reflect what has been used during the numerical experiments and others might reflect the real process more accurately.

In our context, the goal of a user is to satisfy their information need. A user can issue a new search string, look at another page of results or click on a document to inspect its content. At each stage, the user can either, return to a higher level goal, perform another task within the same goal or perform a lower level goal. For instance, after inspecting a result page the user might issue a modified query (higher level goal), look at another page (same level) or click on a document (lower level goal). It is assumed that a goal is completed before the user starts a new one.

The Layered Bayesian Network (BN) model fits more naturally with the hierarchical nature of the user actions. The different states of a latent random variable associated with a goal define as many soft clusters of the actions undertaken by the user within that goal. During training, the BN discovers automatically the states best suited to explain the data it is fed with. At the click level, it could discover that clicks on non relevant documents are associated with a shorter time delta for example.

A main objective is to associate a state with a sequence of user actions at various granularities: a chain, an atomic session, the examination of a page of results, the examination of an URL. Each sequence state should be a good summary of the characteristics of the associated actions like the time spent on a page, the overall relevance, the user satisfaction, etc. These states can in turn be used to predict these variables or to predict future actions like whether the user will rephrase his or her query. By combining various levels of hierarchy and modeling the whole sequence of actions, the model is able to capture the context around a user click at the different levels of granularity: search result examination, atomic search and query chain.

Figure 6:
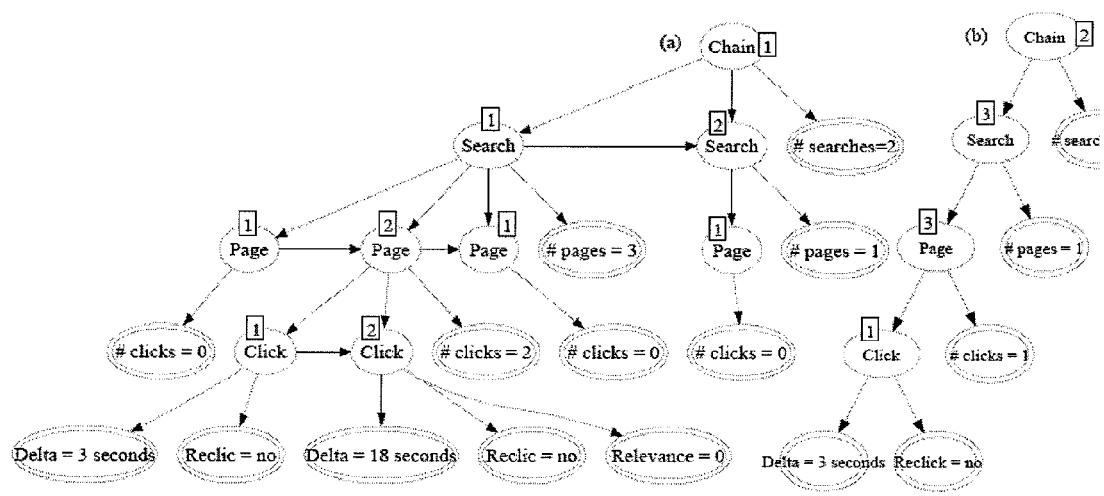
FIG. 6 illustrates a Bayesian Network example associated with one query chain.

Before going into model details, let us first give two examples. In a first scenario, a user issues a query, looks at the first page of results, then at the second page, clicks on a single document on the second page of results, requests a third page of results, rewrites the query after 18 seconds, looks at the first page of results for the second query and then abandons the search. Intuitively, the user was not satisfied and the single document which was clicked on was not relevant. Note that considering the click as relevance feedback would lead to an incorrect conclusion. In the second scenario, the user issues a search, one second later clicks on one document and never returns. From this second session we could infer that the document was relevant and the user satisfied their information need. FIG. 6 is a graphical representation of the two sessions. This example is also an illustration of the Bayesian Network structure that will be described later, but for the moment the important part of the figure is the structure (in terms of goals and subgoals), the different observations, and the states associated with the different goals (boxed numbers).

At the click level, we can first try to categorize the clicks depending on various factors like whether it was done shortly after the user saw the search results, whether it is was a new click or how much time the user spent analyzing the linked document for example. The click state represents only very local information, and it is difficult to draw conclusions from it alone. We could consider two classes, one for clicks occurring shortly after a page view (type 1) and those occurring after a given amount of time, in our case after the inspection of another document (type 2). The states associated to higher level goals effectively define categories of subgoals and click sequences and as such are more informative than the statistics we used to describe clicks: In FIG. 6 we have three types of pages: Pages without clicks (page type 1), pages with a succession of state 1 and 2 clicks (page type 2), and pages with one click of type 1 (page type 3). We can then climb one level at a time in the hierarchy and associate three states to searches corresponding each to a different sequence of page goals, and associate two states to the chains, effectively defining two different types of atomic search sequences. The hierarchy of states provides a context to the individual clicks and permits distinguishing the "bad" click of search (a) in FIG. 6 from the "good" one in search (b).

In the BN network, the observations will influence the distribution over the states of the different latent variables. The next list summarizes the different types of latent random variables (goals) and the observed random variables associated to them. For all but the click goal at the levels of the hierarchy, the states also represents a sequence of direct nested sub-goals directly following them in the list:

Chain is the root variable and represents the query chain type. The associated observation is the number of searches issued during the chain.

Search is a sub-goal at the level of an atomic query session. The observation that we retain at this level is the number of pages of search results requested by the user for this search.

Page represents the behavior of the user on that search result page. The observation is the number of clicks the user performed on the page.

Click is associated with the examination of a document in the search result list. The observations associated with it are (1) the time spent examining the document that is clicked on ("delta"), (2) whether the user already clicked on this document earlier in the atomic session ("reclick") and, if available, (3) the relevance assessment of the document.

Other observations could be associated with each goal. For example, we could attach to a Search goal the time spent by the user looking at search result pages and clicking on documents. Some of the time spent on a Search goal is already modeled as part of the Click goal.

Now that the latent variables have been defined, we turn to the structure of the network. First, we have to link the observations to their corresponding latent variables: We assume that observations are explained by the goal they refer to (i.e. number of clicks for a page goal, number of searches for a chain goal). Second, we link the goals between themselves. As stated above, a distribution over the sequence of sub-goal states is associated with each goal state. We model this by imposing a dependence of the goal on all the subgoals (vertical arrows between latent variables) and a first-order dependence of one of the sub-goals onto the next sub-goal (corresponding to the horizontal arrows in the depicted BN).

Above, we gave a qualitative overview of our BN model, showing the structure of a BN with respect to any possible query chain. In this section, we present it quantitatively, that is, we discuss how to compute the actual probabilities and to learn them. We can define three sets of parameters that were learned using an Expectation-Maximisation (EM) algorithm.

The first set are the parameters encoding the chain prior, which is a prior probability distribution on chain states. The second are the parameters encoding the transition probability to a given goal, from a higher level goal state or from a goal at the same level. In the latter case, we assume that the next goal also depends on the higher level goal state. One parameter is used for each possible configuration. For instance, the probability $\theta^{(search)}_{s,c,sp}$=p(search=s|chain=c, previous search=sp) for the given latent states s, c and sp, is the parameter corresponding to the transition from a Search of type sp to a Search of type s within a Chain of type c. Finally, the third set of parameters encode the generation of observations as for example, the number of clicks given a page state. To model discrete variables with a finite number of states (click or re-click, relevant or not relevant) we use a probability table. To model the number of clicks and the time (discretized in second units), as they are not theoretically bounded, we use a Poisson distribution where the parameter $\lambda$ depends on the corresponding latent state.

While the two last sets of parameters are shared among all the constructed BNs ensuring that the state of a given goal always represents the same underlying observations and sequences of sub-goals, the prior over the chain types is unique to each chain in our data and thus encodes the membership of each chain to the different latent types. This prior is learned as the other shared parameters (among all the chains) of the BN.

As such, through this method and system, user interaction patterns can be determined based on the individual user sessions, the atomic sessions. From this, search engine technology can be greatly improved by utilizing feedback information previously unavailable.

FIGS. 1 through 6 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method comprising:
   generating a plurality of atomic sessions by grouping a query string submitted by a user to a search engine and one or more interactions of the user with one or more results identified in response to the query string, wherein the one or more interactions comprise at least one user selection of the one or more results;
   constructing a first query chain by concatenating the plurality of the atomic sessions occurring within a first time threshold;
   determining a second time threshold based, at least in part, on a distribution of respective lengths of time intervals between successive ones of the plurality of atomic sessions;
   dividing the first query chain into at least one smaller chain based, at least in part, on an identified satisfaction of a need determined at least partially by a processor of the search engine based, at least in part, on:
      the respective lengths of the time intervals between successive ones of the plurality of atomic sessions being less than the second time threshold, and
      a query similarity factor between successive queries within the plurality of atomic sessions, wherein the query similarity factor is based, at least in part, on a combination of at least one symmetric measure as a proximity measure and at least two asymmetric measures between the successive queries, the at least two asymmetric measures comprising a first measurement of inclusion of a first query into a second query and a second measurement of inclusion of the second query into the first query; and
   determining user-interaction patterns relating to the search engine based, at least in part, on the at least one smaller chain.

2. The method of claim 1 further comprising:
   assessing a relevance of a document selected by the user.

3. The method of claim 1, further comprising grouping page search result view activities and user active link selection activities.

4. The method of claim 1 further comprising:
   generating the plurality of atomic sessions based, at least in part, on a plurality of user interaction logs.

5. The method of claim 1 further comprising:
   determining the user-interaction patterns based, at least in part, on a later Bayesian tree-type network.

6. The method of claim 1, wherein the dividing the first query chain into the at least one smaller chain based, at least in part, on the identified satisfaction of the need further comprises:
   dividing the first query chain into at least one intermediate query chain based, at least in part, on the respective lengths of the time intervals between successive ones of the plurality of atomic sessions being less than the second time threshold, and
   dividing the at least one intermediate chain into the at least one smaller query chain based, at least in part, on the query similarity factor between the successive ones of the plurality of atomic sessions.

7. The method of claim 1, wherein the first measurement of inclusion comprises a first probability of first character n-gram of the first query appears in the second query, and the second measurement of inclusion comprises a second probability of a second character n-gram of the second query appears in the first query.

8. A system comprising:
   a computer readable medium having executable instructions stored therein;
   a processing device in communication with the computer readable medium, the processing device to execute the executable instructions to:
      generate a plurality of atomic sessions to be based, at least in part, on a grouping of a query string to be submitted by a user to a search engine and one or more interactions of the user with one or more results to be identified in response to the query string, wherein the one or more interactions to comprise at least one user selection of the one or more results;
      construct a first query chain to be based, at least in part, on a concatenation of the plurality of the atomic sessions to occur within a first time threshold;
      determine a second time threshold to be based, at least in part, on a distribution of respective lengths of time intervals between successive ones of the plurality of atomic sessions;
      divide the first query chain into at least one smaller chain to be based, at least in part, on a to be identified satisfaction of a need to be determined to be based, at least in part, on:

a determination that the respective lengths of the time intervals between successive ones of the plurality of atomic sessions are to be less than the second time threshold, and a query similarity factor between successive queries within the plurality of atomic sessions, wherein the query similarity factor is to be based, at least in part, on a combination of at least one symmetric measure as a proximity measure and at least two asymmetric measures between the successive queries, the at least two asymmetric measures comprise a first measurement of inclusion of a first query into a second query and a second measurement of inclusion of the second query into the first query; and determine user-interaction patterns to relate to the search engine to be based, at least in part, on the at least one smaller chain.

9. The system of claim 8, wherein the executable instructions are further executable by the processing device to assess relevance of a document to be selected by the user.

10. The system of claim 8, wherein the executable instructions are further executable by the processing device to group page search result view activities and user active link selection activities.

11. The system of claim 8, wherein the executable instructions are further executable by the processing device to generate the plurality of atomic sessions to be based, at least in part, on a plurality of user interaction logs.

12. The system of claim 8, wherein the executable instructions are further executable to determine the user-interaction patterns to be based, at least in part, on a later Bayesian tree-type network.

13. A non-transitory computer readable medium comprising program code executable by a programmable processor to:

generate a plurality of atomic sessions to be based, at least in part, on a grouping a query string to be submitted by a user to a search engine and one or more interactions of the user with one or more results to be identified in response to the query string, wherein the one or more interactions to comprise at least one user selection of the one or more results;

construct a first query chain to be based, at least in part, on a concatenation of the plurality of the atomic sessions to occur within a first time threshold;

determine a second time threshold to be based, at least in part, on a distribution of respective lengths of time intervals between successive ones of the plurality of atomic sessions;

divide the first query chain into at least one smaller chain to be based, at least in part, on a to be identified satisfaction of a need to be determined to be based, at least in part, on:

a determination that the respective lengths of the time intervals between successive ones of the plurality of atomic sessions are to be less than the second time threshold, and a query similarity factor between successive queries within the plurality of atomic sessions, wherein the query similarity factor is to be based, at least in part, on a combination of at least one symmetric measure as a proximity measure and at least two asymmetric measures between the successive queries, the at least two asymmetric measures comprise a first measurement of inclusion of a first query into a second query and a second measurement of inclusion of the second query into the first query; and determine user-interaction patterns to relate to the search engine to be based, at least in part, on the at least one smaller chain.

14. The non-transitory computer readable medium of claim 13, wherein the program code is further executable by the programmable processor to assess relevance of a document to be selected by the user.

15. The non-transitory computer readable medium of claim 13, wherein the program code is further executable by the programmable processor to group page search result view activities and user active link selection activities.

16. The non-transitory computer readable medium of claim 13, wherein the program code is further executable by the programmable processor to generate the plurality of atomic sessions to be based, at least in part, on a plurality of user selection logs.

17. The non-transitory computer readable medium of claim 13, wherein the program code is further executable by the programmable processor to determine the user-interaction patterns to be based, at least in part, on a later Bayesian tree-type network.

* * * * *